Patented Mar. 2, 1943

2,312,440

UNITED STATES PATENT OFFICE 2,312,440

ALKALOID SALTS AND THE MANUFACTURE THEREOF

Jean Lucien Regnier, Paris, France; vested in the Alien Property Custodian

No Drawing. Application March 27, 1936, Serial No. 71,309. In France April 2, 1935

2 Claims. (Cl. 260—472)

The present invention relates to methods for improving the physiological properties of anaesthetic bases and alkaloids.

I have explained in my U. S. patent application Ser. No. 738,375 that some acids, such as benzoic acid for instance, and also salicylic acid, are capable of improving, in the salts that derive therefrom, the anaesthetic power as compared with that of the corresponding hydrochlorides.

One of the objects of the present invention is to provide other acids capable of similarly enhancing the properties of anaesthetic bases and physiologically useful alkaloids. Another object of the invention is to combine acids with alkaloids other than that cited in my prior patent application so as to enhance the physiological action of said alkaloids. Still another object of the invention is to provide salts in which an acyl group R—CO— is incorporated in the molecule.

The following examples show that everything takes place as if the anaesthetic base or alkaloid salts acted as a whole and as if hydrolysis or the variation of pH had not the preponderating action they were supposed to have up to the present time.

I have found that, in preparing cocaine salts, if benzoic acid is replaced by phenylacetic acid, a fresh solution is obtained the anaesthetic power of which, compared, before sterilization, with that of the hydrochloride of the same base, is twelve times greater, the pH-value of the two solutions being kept close to 4.

Without insisting on these new facts relating to stupefactive bases of the kind of cocaine, the following example is intended to show more especially the variation of the anaesthetic powers obtained when the anaesthetic base, instead of being a toxic body, such as cocaine, is an organic complex such as paraaminobenzoyldiethylaminoethanol.

In the following example, as above stated, the acids that are cited must not be considered as limiting the nature and quantity of salts employed, but merely as examples illustrating the kind of active salts according to the present invention.

*Example I.*—Increase of the anaesthetic power of the paraaminobenzoyldiethylaminoethanol base taken in the form of different salts obtained by direct combination of the acid and the base.

As the hydrochloride of paraaminobenzoyldiethylaminoethanol penetrates but with considerable difficulty into the cells, this salt cannot be employed in ophthalmology, oto-rhino-laryngology, etc., but if a suitable salt of the same base could constitute owing to its cellular penetration a surface anaesthetic, this new salt would advantageously replace the cocaine hydrochloride used at the present time. The following example will show how such a satisfactory new salt may be manufactured:

As hydrochloride of paraaminobenzoyldiethylaminoethanol contains, per gramme, 0.866 gramme of base, I prepare, by merely combining the base with the acids that are chosen, aqueous solutions of various salts conntaining 0.866 gr. of base per 100 cubic centimeters, that is to say the same amount of anaesthetic base as one per cent solutions of hydrochloride of paraaminobenzoyldiethylaminoethanol.

These solutions are given a pH ranging approximately between 5.2 and 5.4; sterilizations are performed at a temperature of 110° C. for 15 minutes. The solutions were tested on the cornea of a rabbit according to Régnier's test (Bull. Soc. Pharm. 1923, 30 580, 646). The results obtained are given by the following table:

*Salts of paraaminobenzoyldiethylaminoethanol*

| Nature of the salts | pH before sterilization | pH after sterilization | Anaesthetic power after sterilization as compared with that of nonheated cocaine hydrochloride | Anaesthetic power after sterilization as compared with that of paraaminobenzoyldiethylaminoethanol hydrochloride nonheated |
|---|---|---|---|---|
| Phenylbutylacetate | | 5.6 | 2.1 times greater | 29.4 times greater. |
| Cinnamate | 6.1 | 5.6 | 1.47 times greater | 20.58 times greater. |
| Phenylpropionate | 5.4 | 5.4 | 1.23 times greater | 17.22 times greater. |
| Phenylacetate | 5.4 | 5.4 | 0.8 of the unit | 11.2 times greater. |
| Hydratropate | | | 0.67 of the unit | 9.38 times greater. |
| Crotonate | 5.4 | 5.4 | 0.57 of the unit | 7.98 times greater. |
| Phenylcinchoninate | 6.5 | 6.0 | 0.2 of the unit | 2.8 times greater. |
| Hippurate | 4.6 | 4.7 | Practically zero | |
| Nicotate | 5.2 | 5.2 | Practically zero | |
| Phthalate | 5.4 | 5.2 | Practically zero | |

The data given by this table show that salts such as cinnamate of paraaminobenzoyldiethylaminoethanol keep, after sterilization, an activity which is 1.47 times that of cocaine hydrochloride and phenylbutylacetate of paraaminobenzoyldiethylaminoethanol 2.1 times that of the same chlorhydrate of cocaine in a solution prepared extemporaneously and nonheated.

Therefore, the method according to the present invention permit of transforming the paraaminobenzoyldiethylaminoethanol into an anaesthetic which is more active and less noxious than cocaine.

It follows that not only can the anaesthetic power of a base be improved but it is possible to give a body such as paraaminobenzoyldiethyl- aminoethanol (which is from 10 to 14 times less active than cocaine hydrochloride and therefore abandoned for some applications) anaesthetic properties which make it extremely active and even better than cocaine hydrochloride taken under the best possible conditions, in particular in the applications just above mentioned.

*Example II.*—Increase of the anaesthetic power of paraaminobenzoyldiethylaminoethanol in the form of various salts, prepared through double decomposition.

I prepare, through a double decomposition reaction between hydrochloride of paraaminobenzoyldiethylaminoethanol and solutions of various magnesium salts, liquors containing various salts of the anaesthetic base. I take one per cent solutions of hydrochloride of paraminobenzoyldiethylaminoethanol and one per cent solutions of the magnesium salts, or solutions such that the magnesium salt is present therein in equimolecular quantity.

After sterilization, the anaesthetic power is measured in comparison with cocaine hydrochloride, that is to say in comparison with the anaesthetic power of the one percent solution of cocaine hydrochloride prepared at the same time and which has not been subjected to a heating action.

The results are given by the following table:

I obtain, as in the case of cocaine, an improvement of the anaesthetic action which corresponds to about twelve times the activity of the ordinary hydrochloride.

In the two examples above given, the salts of the anaesthetic base may be represented, in the case of paraaminobenzoyldiethylaminoethanol, by a formula such as the following:

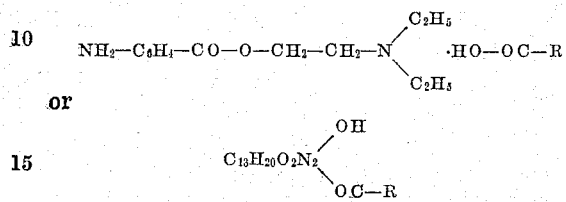

which shows the part taken in the molecule by the acyl residue, R—CO.

Such a group can be integrated to the very molecule of the anaesthetic base when said base includes a primary or secondary amine function.

The following example relates to the obtainment of anaesthetic salts in which an acyl group is thus introduced through a condensation reaction into the anaesthetic.

*Example III.*—Salts of anaesthetic bases in which an amide function has been produced.

The general character of reactions of this kind permits of giving a simple example which suffices for explaining the nature of the method.

To 24 parts by weight of paraaminobenzoyldiethylaminoethanol, dissolved in anhydrous ether for instance, I gradually add 14 parts of

| Nature of the salts for the obtainment of mixed solutions | Anaesthetic power after sterilization as compared with nonheated cocaine hydrochloride | Anaesthetic power after sterilization as compared with nonheated hydrochloride of paraaminobenzoyldiethylaminoethanol |
|---|---|---|
| Hydrochloride of paraaminobenzoyldiethylaminoethanol 1% combined with the following salts of magnesium: | | |
| Phenylpropionate 1.20% | 3 times greater | 42 times greater. |
| Cinnamate 1.84% | 2 times greater | 28 times greater. |
| Crotonate 0.70% | 1.64 times greater | 22.96 times greater. |
| Phenylbutylacetate | 1.9 times greater | 26.6 times greater. |
| Isobutyrate | 1.7 times greater | 23.8 times greater. |
| Hydratropate 1.20% | Equal to one | 14 times greater. |
| Phenylacetate | do | Do. |
| Butyrate 0.72% | do | Do. |
| Anisate 1% | Substantially equal to one | Do. |
| Valerianate 0.90% | Lower than one | Below 14. |
| Sebacate 1% | do | Do. |
| Phenylpropiolate | do | Do. |
| Propionate | Low | Do. |
| Paraaminobenzoate | Very low | Do. |
| Camphosulfonate 2.28% | do | Do. |
| Quinate 1.90% | do | Do. |
| Cholalate | Zero | Zero. |
| Camphorate 1.30% | do | Do. |
| Ethoxyacetate 0.84% | do | Do. |
| Lactate 0.95% | do | Do. |
| Acetylglycocollate 0.82% | do | Do. |
| Gluconate | do | Do. |

From these data it results very clearly that the one per cent solutions of hydrochloride of paraaminobenzoyldiethylaminoethanol mixed with certain salts of magnesium can become, after sterilization, several times more active on the cornea of a living being than a solution of hydrochloride of paraminobenzoyldiethylaminoethanol freshly made and not sterilized.

Furthermore, the salts of paraaminobenzoyldiethylaminoethanol obtained through the processes of Examples I and II above described assume, after sterilization or after having been stored, a state of equilibrium, with a pH-value of about 5.4, with a perfect preservation of the initial anaesthetic properties.

If in paraaminobenzoyldiethylaminoethanol phenylpropionate, the anaesthetic base is replaced by dimethylaminobenzoylethylisopropanol, benzoyl chloride itself dissolved in the same solvent. I obtain immediately a precipitate of the complex of addition of the two reacting bodies, which complex, after crystallization out of absolute alcohol, melts at a temperature of 191° C. This compound gives a substantially neutral aqueous solution. The chloride or hydrochloride

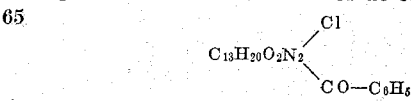

treated with diluted sodium hydroxide, permits of separating a benzoyl compound melting at a temperature of 78–79° C., forming a body soluble in ether and insoluble in water, but which can, nevertheless, be caused to dissolve in this solvent by adding, molecule by molecule, for instance acetic acid, or any other acid.

Some of the salts thus obtained may have an anaesthetic power about ten times higher than that of cocaine hydrochloride.

The following table gives, by way of example, the physical constants of some amide derivatives obtained from various acids and the paraaminobenzoyldiethylaminoethanol:

| Chlorides of acids caused to react | Hydrochloride of the amide base obtained | Separated amide base |
|---|---|---|
| Acetyl | Deliquescent | Viscous. |
| Isobutyryl | 142° C | Do. |
| Benzoyl | 191° C | 77-78° C. |
| Phenylacetyl | Deliquescent | 73° C. |
| Phenylbutylacetyl | Very hygroscopic. | Viscous. |
| Phenylpropionyl | 132° C | 80° C. |

The benzoic amide of ethyl paraaminobenzoate, the formula of which is:

$$C_6H_5—CO—NH—C_6H_4—CO—OC_2H_5$$

melts at a temperature of 148° C.

It results from these observations that:

1. Salts and derivatives of bases known under the names of: Tutocaine, Stovaine, Percaine, Butelline (para-aminobenzoyl-di-n-butylaminopropanol), Pantocaine, anaesthetic cocaine, Butesine, etc., which are employed in the medical art besides cocaine and para-aminobenzoyldiethylaminoethanol for anaesthetic purposes, were actually prepared.

2. Salts of quinine, morphine, codeine, heroin, papaverine, pilocarpine, atropin, eserin, spartein, strychnine, etc., were obtained.

The following examples relate to salts of alkaloids other than salts of local anaesthetics. I have, in particular, described salts of quinine and morphine the properties of which were found experimentally to be deeply modified through association of the alkaloidic base with different acids.

*Example IV.*—Salts of quinine of various organic acids.

Generally, basic salts of quinine are formed: for instance, the basic cinnamate is obtained by adding an amount of cinnamic acid slightly above the theoretical amount to an alcoholic solution of quinine hydrate and precipitating with water. The salt that is obtained crystallizes with 2H₂O and melts at a temperature of 93-94° C., its molecular weight corresponding to 508.

Another cinnamate which is more acid crystallizes in the anhydrous state and melts at 141° C. Its molecular weight 546 corresponds to 1 molecule of quinine for 1.5 molecule of cinnamic acid.

The basic phenylpropionate of quinine crystallizes with two molecules of water and melts at 90-91°. Its molecular weight 510 corresponds to one molecule of quinine combined with one molecule of phenylpropionic acid.

Quinine quinate crystallizes with one molecule of water and melts at a temperature of 199° C.; its molecular weight is 534.

Quinine hydantoate crystallizes with one molecule of water and melts at a temperature of 172° C.; its molecular weight is 460.

Salts of the kind of those just above cited can also be obtained through a double decomposition reaction.

*Example V.*—Salts of morphine of various organic acids.

The salts obtained with morphine do not possess the same continuity of composition as those obtained with quinine.

When it is endeavoured to prepare morphine phenylpropionate by making use of equimolecular amounts of phenylpropionic acid and morphine, and dissolving them in the hot state in distilled water, a semi-liquid product precipitates, on cooling; said product does not crystallize, has a consistency analogous to that of honey, and finally constitutes a vitrous mass which can be obtained in the form of definite crystals.

Morphine quinate likewise gives a varnish which does not crystallize, same as malic acid or hydroxyisovaleric acid.

Morphine citrate is a well crystallized body provided that equimolecular proportions of acid (although it is tribasic) and base are employed. This is a strongly acid salt, melting at 165° C.

Morphine phenylacetate obtained with equimolecular amounts of phenylacetic acid and morphine melts in a capillary tube at 92-93° C.

Morphine mandelate melts at a temperature of 150° C.

Hydantoate melts with decomposition, at 220° C.

Morphine gluconate, obtained through double decomposition, gives solutions the properties of which are particularly active.

Other salts, not yet known, can, as those above cited, be also prepared through double decomposition.

Concerning the practical properties of these various salts of morphine, I have found that, by varying the acid radical, the salts are not given properties different from those of the alkaloidic base, but it is possible, as in the case of local anaesthetics, to act on the the rapidity, the duration and, so to speak, on the density of the action of morphine.

The citrate, quinate and gluconate are found to penetrate but relatively slowly and gradually into the cells, whereby they permit of obtaining, for a given amount of salt, an effect which lasts for a longer time than when dealing with salts such as benzoate or phenylpropionate which penetrate more readily and more rapidly but also egress more readily and more rapidly out of the cells.

What I claim is:

1. A salt of β-phenyl-propionic acid and diethyl-amino-ethanol-p-amino benzoate.

2. A process for producing water-soluble anaesthetic compounds, which comprises reacting an anaesthetic base which is a para-aminobenzoic ester of an alkamine with an acylating agent the acyl group of which is that of an aralkyl monocarboxylic acid having, in its aliphatic parts, from 3 to 6 carbon atoms including the carbon atom of the carboxylic group, so as to form an acylated alkamine, and reacting the acylated alkamine with an acid.

JEAN LUCIEN REGNIER.